(12) United States Patent
Park (10) Patent No.: US 8,526,790 B2
(45) Date of Patent: Sep. 3, 2013

(54) STRUCTURE OF NAVIGATION INFORMATION FOR VIDEO DATA RECORDED ON A RECORDING MEDIUM AND RECORDING/REPRODUCING METHOD AND APPARATUS USING THE STRUCTURE

(75) Inventor: Sung Wan Park, Suwon-si (KR)

(73) Assignee: LG Electronics Inc., Seoul (KR)

(*) Notice: Subject to any disclaimer, the term of this patent is extended or adjusted under 35 U.S.C. 154(b) by 1253 days.

(21) Appl. No.: 11/269,623

(22) Filed: Nov. 9, 2005

(65) Prior Publication Data

US 2006/0152635 A1 Jul. 13, 2006

Related U.S. Application Data

(60) Provisional application No. 60/639,800, filed on Dec. 29, 2004.

(30) Foreign Application Priority Data

Jul. 21, 2005 (KR) .......................... 10-2005-0066196

(51) Int. Cl.
H04N 9/80 (2006.01)
H04N 5/92 (2006.01)

(52) U.S. Cl.
USPC ............................. 386/248; 386/239; 386/244

(58) Field of Classification Search
USPC ............... 386/46, 83, 95, 125, 126, 239–248, 386/326–342, 353–357
See application file for complete search history.

(56) References Cited

U.S. PATENT DOCUMENTS

| | | | | |
|---|---|---|---|---|
| 7,236,687 B2 * | 6/2007 | Kato et al. | ...................... | 386/95 |
| 2002/0131761 A1 | 9/2002 | Kawasaki et al. | | |
| 2002/0196365 A1 | 12/2002 | Cho et al. | | |
| 2003/0002858 A1 * | 1/2003 | Kikuchi et al. | .................. | 386/98 |
| 2004/0213093 A1 | 10/2004 | Seo et al. | | |
| 2004/0247294 A1 | 12/2004 | Jung et al. | | |
| 2005/0084248 A1 * | 4/2005 | Yoo et al. | ......................... | 386/95 |
| 2008/0138041 A1 | 6/2008 | Itoi et al. | | |

FOREIGN PATENT DOCUMENTS

| | | |
|---|---|---|
| EP | 1 271 526 | 1/2003 |
| EP | 1 711 011 | 10/2006 |
| JP | 2003-006998 | 1/2003 |
| KR | 10-2004-0086877 | 10/2004 |
| WO | WO 01/82608 | * 11/2001 |
| WO | WO 2004/001751 A1 | 12/2003 |
| WO | WO 2004/072964 | 8/2004 |
| WO | WO 2004/084212 A1 | 9/2004 |
| WO | WO 2005/038805 A1 | 4/2005 |
| WO | WO 2005/074273 | 8/2005 |

OTHER PUBLICATIONS

International Search Report dated Jan. 27, 2006.
Search Report by European Patent Office dated Aug. 12, 2009 for counterpart European application 05823692.
Office Action issued on Jul. 27, 2011, in corresponding Korean Patent Application No. 10-2005-0066196.

* cited by examiner

*Primary Examiner* — Hung Dang
(74) *Attorney, Agent, or Firm* — Harness, Dickey & Pierce, P.L.C.

(57) ABSTRACT

A structure of navigation information for video data recorded on a recording medium and recording/reproducing methods and apparatuses using the structure. A primary data stream and secondary data streams associated with the primary data stream are recorded on a recording medium and access management information such as TMAP information is created for each of the recorded data streams and recorded thereon, the access management information including type information indicating whether the corresponding data stream is a primary stream or a secondary stream.

14 Claims, 6 Drawing Sheets

| Field Name | Contents | Bytes |
|---|---|---|
| EVOB_TY | EVOB type | 2 |
| EVOB_VM_ATR | Main Video Attribute of EVOB | 4 |
| EVOB_VS_ATR | Sub Video Attribute of EVOB | 4 |
| EVOB_VS_LUMA | Luma value for Sub Video of EVOB | 2 |
| reserved | reserved | 2 |
| EVOB_AMST_Ns | Number of Main Audio streams of EVOB | 2 |
| EVOB_AMST_ATRT | Main Audio stream attribute table of EVOB | 32 |
| EVOB_DM_COEFTS | Down-mix coefficient table for Audio streams of EVOB | 144 |
| EVOB_ASST_Ns | Number of Sub Audio streams of EVOB | 2 |
| EVOB_ASST_ATRT | Sub Audio stream attribute table of EVOB | 32 |
| reserved | reserved | ? |
| EVOB_SPST_Ns | Number of Sub-picture streams of EVOB | 2 |
| EVOB_SPST_ATRT | Sub-picture stream attribute table of EVOB | 160 |
| EVOB_SDST_PLT | Sub-picture palette for SD of EVOB | 4x16 |
| EVOB_HDST_PLT | Sub-picture palette for HD of EVOB | 4x16 |
| reserved | reserved | 506 |

| Field Name | Contents | Bytes |
|---|---|---|
| EVOB_TY | EVOB type | 2 |
| EVOB_VM_ATR | Main Video Attribute of EVOB | 4 |
| EVOB_VS_ATR | Sub Video Attribute of EVOB | 4 |
| EVOB_VS_LUMA | Luma value for Sub Video of EVOB | 2 |
| reserved | reserved | 2 |
| EVOB_AMST_Ns | Number of Main Audio streams of EVOB | 2 |
| EVOB_AMST_ATRT | Main Audio stream attribute table of EVOB | 32 |
| EVOB_DM_COEFTS | Down-mix coefficient table for Audio streams of EVOB | 144 |
| EVOB_ASST_Ns | Number of Sub Audio streams of EVOB | 2 |
| EVOB_ASST_ATRT | Sub Audio stream attribute table of EVOB | 32 |
| reserved | reserved | 2 |
| EVOB_SPST_Ns | Number of Sub-picture streams of EVOB | 2 |
| EVOB_SPST_ATRT | Sub-picture stream attribute table of EVOB | 160 |
| EVOB_SDST_PLT | Sub-picture palette for SD of EVOB | 4x16 |
| EVOB_HDST_PLT | Sub-picture palette for HD of EVOB | 4x16 |
| reserved | reserved | 506 |

STRUCTURE OF NAVIGATION INFORMATION FOR VIDEO DATA RECORDED ON A RECORDING MEDIUM AND RECORDING/REPRODUCING METHOD AND APPARATUS USING THE STRUCTURE

DOMESTIC PRIORITY INFORMATION

This application claims the benefit of priority under 35 U.S.C. §119 on U.S. Provisional Patent Application 60/639,800, filed Dec. 29, 2004; the entire contents of which are hereby incorporated by reference.

FOREIGN PRIORITY INFORMATION

This application claims the benefit of priority under 35 U.S.C. §119 on Korean Patent Application 10-2005-0066196, filed Jul. 21, 2005; the entire contents of which are hereby incorporated by reference.

BACKGROUND

1. Field

This document relates to a structure of navigation information for a read-only recording medium having primary and secondary data streams recorded thereon and recording/reproducing methods and apparatuses using the structure.

2. Description of the Related Art

The DVD-ROM, which is usually called the DVD, has a storage capacity of 4.7 GB and is commonly used as a storage medium for delivering high-quality digital contents such as movies.

TV stations currently broadcast in both analog and digital but only digital TV broadcast will be available in the near future. Digital broadcast provides better video quality over its analog counterpart. Viewers have a natural desire to enjoy movies of higher video quality than that of the DVD.

For this reason, read-only disks having higher storage capacity than the DVD are under development. Higher-capacity disks can provide viewers with high-quality contents in more various ways. For example, a higher-capacity disk may provide a main content and additional video or audio contents associated with the main content simultaneously.

The additional data streams are considered secondary data streams of the primary data stream which provides the main video. Because search and playback operations can be performed on the secondary data streams as well as on the primary data stream, navigation data for the secondary data streams is also required. If there is a great difference in the structure of the navigation data for secondary data streams and the structure of the navigation data for the primary data stream, it makes the design and upgrade of firmware for operating reproducing apparatuses difficult. It is desirable, therefore, that the structure of the navigation data for the primary data stream be designed such that the navigation data for secondary data streams can be accommodated therein.

SUMMARY OF THE INVENTION

It is therefore an object of the present invention to provide a structure of navigation data that allows reproduction of a recording medium having both primary and secondary data streams recorded thereon and to provide recording/reproducing methods and apparatuses using the structure.

The present invention records a primary data stream and secondary data streams associated with the primary data stream on a recording medium, creates access management information for each of the data streams, and records the created access management information thereon, wherein the access management information includes type information indicative of the type of the corresponding data stream.

In one embodiment of the invention, the access management information utilizes the name of the corresponding stream data file as information indicative of the position of the corresponding stream data.

In another embodiment, if the type information indicates that the corresponding data stream is a primary data stream, a value corresponding to the distance between a particular position (e.g., the start position) in a file containing management information for all data streams of a first type recorded on the recording medium and the start position of the corresponding data stream is written as information indicative of the position of the corresponding data stream in the access management information. If the type information indicates that the corresponding data stream is a secondary data stream, a value corresponding to an absolute address of the start position of the corresponding data stream is written as information indicative of the position of the corresponding data stream in the access management information. Attribute information for the secondary data stream is written in the access management information for the corresponding data stream or in a separate file.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DETAILED DESCRIPTION OF THE PREFERRED EMBODIMENTS

In order that the invention may be fully understood, preferred embodiments thereof will now be described with reference to the accompanying drawings.

Figure 1:
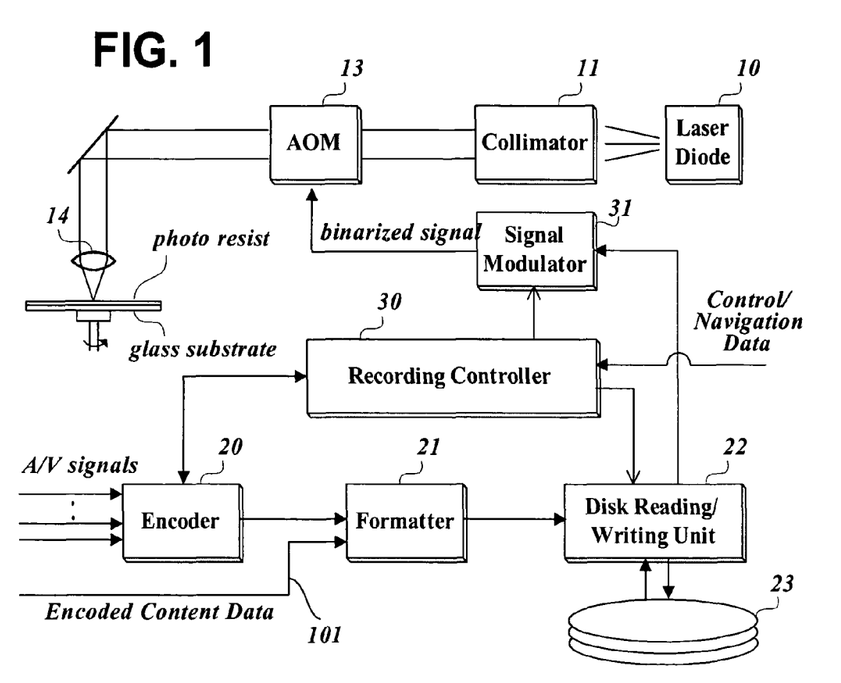
FIG. 1 illustrates a block diagram of an apparatus for manufacturing read-only recording mediums having navigation information according to the present invention thereon.

FIG. 1 is a block diagram of an apparatus for manufacturing read-only optical disks having the navigation data in accordance with the present invention thereon. The apparatus comprises a laser diode 10 for generating a laser beam, a collimator 11 for collimating the generated laser beam, an optical modulator 13 for passing or blocking the parallel beam from the collimator 11 depending on the level of a modulated input signal (e.g., EFM signal), a condensing lens 14 for concentrating the beam from the optical modulator 13 on a photosensitive layer (e.g., photo resist) located on a glass substrate, an encoder 20 for encoding input content data in the MPEG format, a formatter 21 for formatting the encoded data into ECC block data for recording, a high-capacity storage medium 23 (e.g., hard disk drive) for storing data, a disk reading/writing unit 22 for reading/writing data from/to the storage medium 23, a signal modulator 31 for modulating data stored in the storage medium 23 into a binary signal such as EFM signal, and a recording controller 30 for processing user input, for creating navigation data for contents being recorded, and for controlling the irradiation of the laser beam on the photosensitive layer.

To produce a read-only disk using the apparatus shown in FIG. 1, it is required to write content data to be recorded on the read-only disk and navigation data for the content data to the storage medium 23. The data stored therein is read under the control of the recording controller 30 and then modulated into a binary signal by the signal modulator 31. The optical modulator 13 passes or blocks the collimated laser beam depending on the level of the modulated signal, thereby forming a pit train corresponding to the modulated signal on the photosensitive layer located on the glass substrate. Controlled by the recording controller 30, the condensing lens 14 moves outward slowly during the pit-forming process, thereby making the pit train be a spiral pattern. The pit train represents data corresponding to the content data and navigation data therefor stored in the storage medium 23. A stamper is made using the photosensitive layer having the pit train thereon and read-only disks storing the content data and navigation data according to the present invention are manufactured using the stamper.

Because the content data and navigation data stored in the storage medium 23 are directly mapped to the read-only disk, the data structure of the storage medium 23 is the same as the data structure of the read-only disk. The method of writing data to the storage medium 23 according to the invention will now be described.

An input video signal is encoded in a particular format (e.g., MPEG) by the encoder 20 and converted into ECC blocks by the formatter 21 and then written to the storage medium 23 by the reading/writing unit 22. Also, a data stream pre-encoded by another apparatus can be provided from another storage medium 101.

Figure 2:
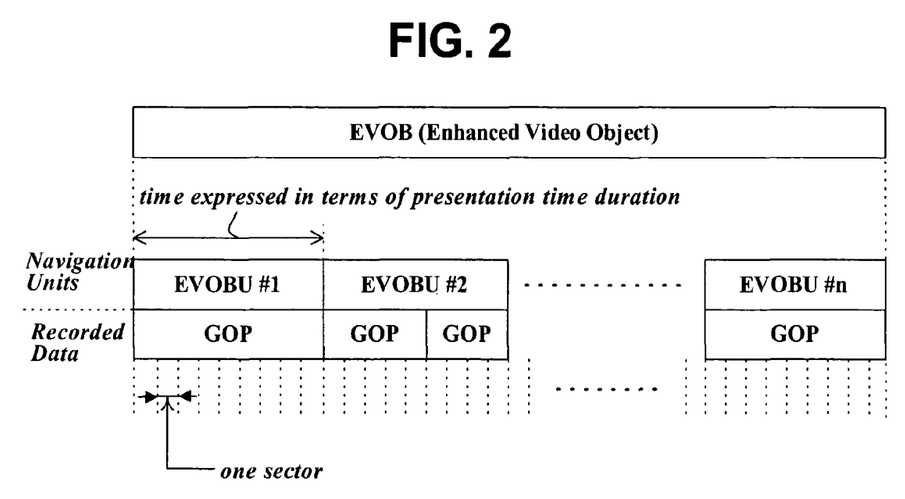
FIG. 2 illustrates an example of the process of recording video data by organizing the video data into navigation units.
Figure 3:
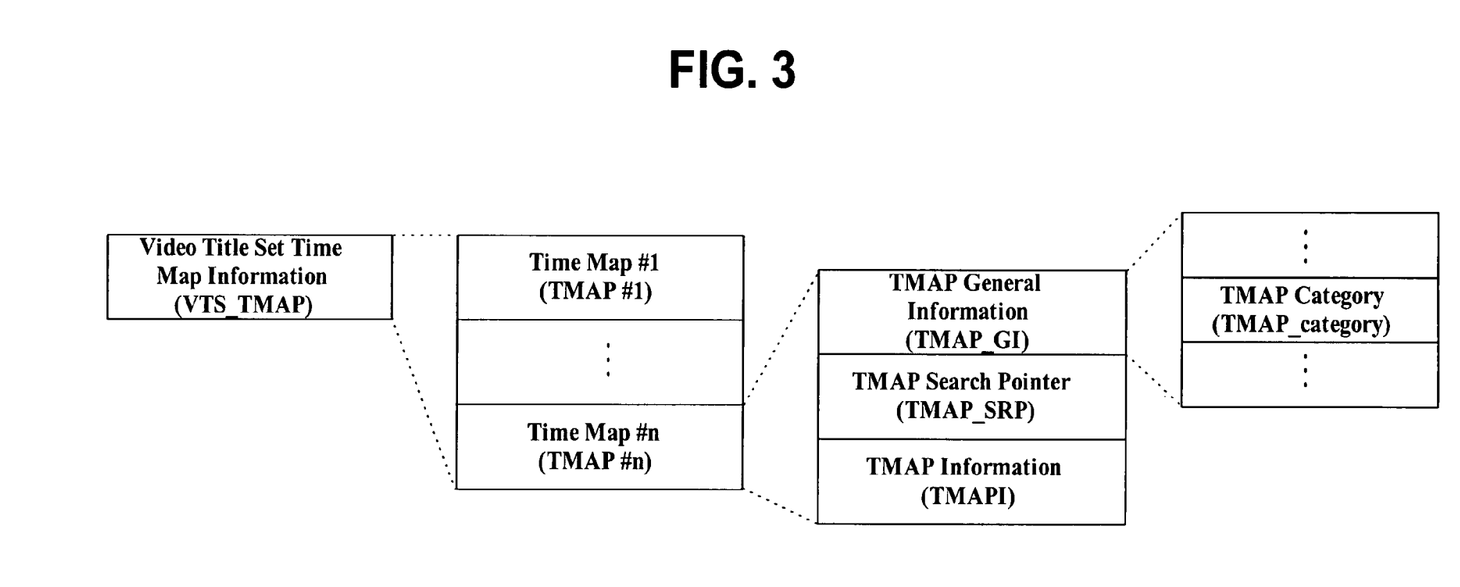
FIG. 3 illustrates the hierarchical structure of video title set time map (VTS_TMAP) information including the TMAP category field.

The encoder 20 encodes primary data into GOPs each of which comprises a leading I-picture and possibly more pictures. The recording controller 30 organizes one or more successive GOPs into a navigation unit such that the presentation time duration thereof is between 0.4 and 1 second and creates navigation information for the navigation unit. Information necessary for the creation of the navigation unit is provided by the encoder 20. A navigation unit is called an EVOBU (enhanced video object unit) and the data section corresponding to a recorded title is called an EVOB (enhanced video object). The size and presentation time duration of each of the created navigation units is recorded as TMAP (time map) information. The TMAP information, which is management information for accessing the recorded title, includes TMAP general information (TMAP_GI) as well as information on each navigation unit. As shown in FIG. 3, the TMAP general information has a TMAP_category field for indicating the type of the stream associated with the TMAP information, (e.g., primary stream or secondary stream). In FIG. 3, the TMAP_category field has a value of '0', which means that the associated data stream is a primary stream.

Each navigation unit is aligned with sectors and recorded in the data area of the storage medium 23, each sector having a size of 2048 bytes. The fact that each navigation unit is recorded in the data area of the storage medium 23 means that the data written to the storage medium 23, which will be recorded as pits on the read-only disk, will be mapped to the data area of the read-only disk.

After recording one or more primary data streams, i.e., EVOBs, the recording controller 30 creates video title set information (VTSI) including the TMAP information created for each of the primary data streams and necessary management information and writes the video title set information (VTSI) in a single file (e.g., Video_TS.ifo). In this case, the user may be requested to enter information required for creating the video title set information (VTSI) through graphic user interface (GUI).

TMAP information created for each of the EVOBs includes information on the start position of the corresponding EVOB. If each of the recorded EVOBs is managed as a file, the information on the start position can be the name of the file. Also, the information on the start position can be a value indicating the relative distance between a particular position in the video title set information (VTSI) (e.g., the start position of the VTSI) and the start position of the corresponding EVOB. The distance can be expressed in terms of logical blocks each of which has a predefined size.

Figure 4A:
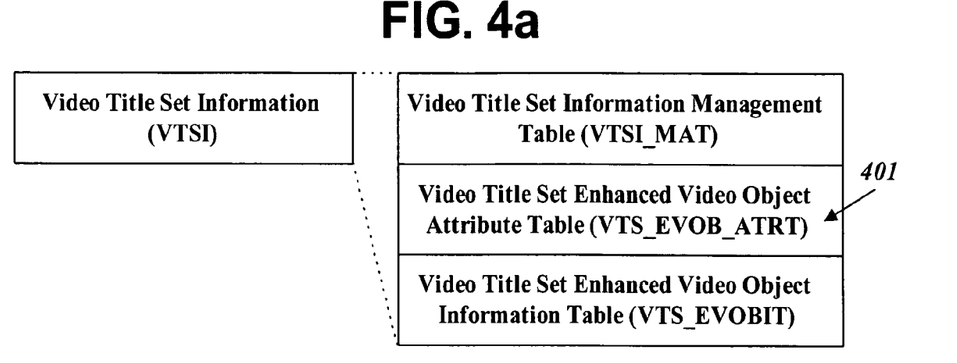
FIG. 4a illustrates the video title set information (VTSI) including an attribute information table storing the attribute of each of primary data streams (EVOBs)
Figure 4B:
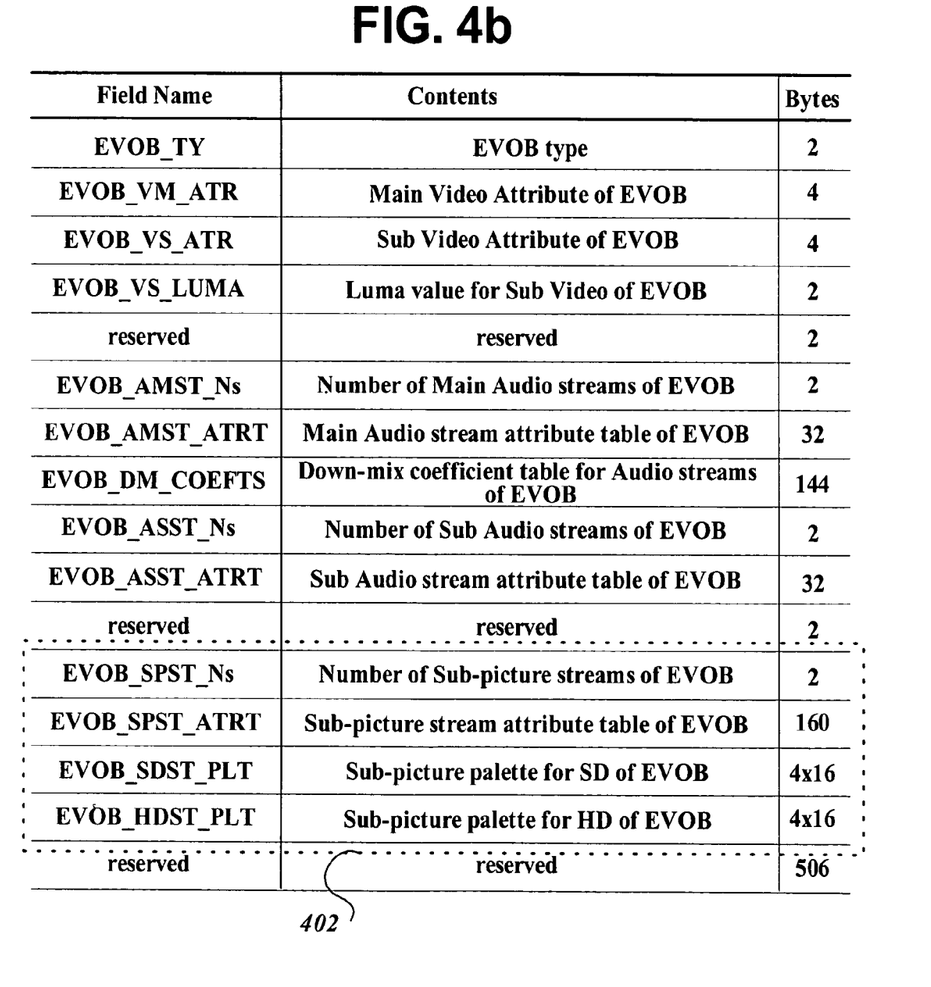
FIG. 4b illustrates the structure of the attribute information for a primary data stream.

The video title set information (VTSI) also includes attribute information for each of the EVOBs. As shown in FIG. 4a, the attribute information is contained in an EVOB attribute table 401 assigned in the video title set information (VTSI). The attribute information has a structure as shown in FIG. 4b and contains information necessary for the playback of the data stream contained in the EVOB (e.g., attributes of the video and audio carried in the EVOB and the number of primary audio streams). The attribute information is not the concern of the present invention and the detailed description thereof is omitted.

Like the primary data streams, the secondary streams associated with the primary data streams are organized into navigation units and recorded in the data area of the storage medium 23 in the same manner. Also, the recording controller 30 creates and writes TMAP information for each of the secondary data streams (S_EVOBs). However, the video title set information (VTSI) is not created for the secondary streams.

Figure 5:
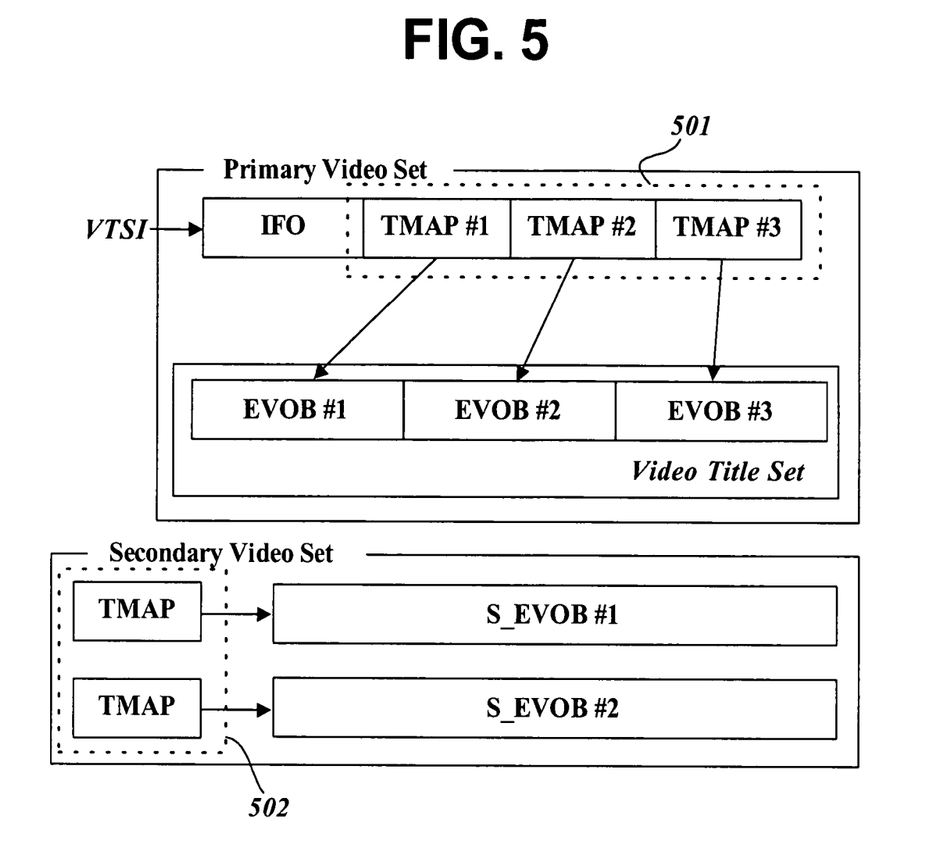
FIG. 5 illustrates an example of data recorded on a recording medium wherein primary data streams, associated secondary data streams, and management information therefor exist.

As a result, a data structure as shown in FIG. 5 is written to the storage medium 23. In the example of FIG. 5, three titles EVOB #1~EVOB #3, TMAP 501 associated with each of the titles, a VTSI for a recorded title set, two secondary titles S_EVOB #1 and S_EVOB #2, and TMAP 502 associated with each of the secondary titles are written to the storage medium 23.

The TMAP created for each of the secondary data streams has the same data structure as the TMAP created for each of the primary data streams (i.e., EVOBs). The general information of the TMAP created for each of the secondary data streams has the TMAP_category field as shown in FIGS. 3 and 1 is stored therein.

Because video title set information (VTSI) is not created for the recorded secondary streams, the information on the start position of a secondary data stream (S_EVOB) written in the TMAP information thereof cannot be the relative distance from the start position of the video title set information (VTSI). Instead, absolute position information on the secondary data stream such as the address of the start logical block is written. In the case where each of the secondary data streams (S_EVOBs) is written as a single file, the stream file name can be written as the start position information in the TMAP information.

Because there is no video title set information (VTSI) for secondary data streams, attribute information required for the playback of the secondary data stream (S_EVOB) is written in a field within the associated TMAP information or in a separate file. The attribute information does not include the group of attributes marked as 402 in FIG. 4b because secondary data streams are not allowed to have the attributes for sub-pictures.

A reproducing apparatus uses the TMAP_category field to determine whether to obtain the attribute information for recorded data streams. If the TMAP_category field has a value of 0, the reproducing apparatus obtains the attribute information for the corresponding data stream, which is a primary data stream, from the EVOB attribute table of the video title set information (VTSI). If the value of the TMAP_category field is 1, the reproducing apparatus obtains the attribute information for the corresponding data stream, which is a secondary data stream, from a field added to the TMAP information or a particular file storing the attribute information.

The navigation information can be written after all data streams, i.e., primary and second data streams, are written. The navigation information is written in the database area which stores management information and is positioned in front of the area in which the content data is written. The fact that the navigation information is written in the database area means that the database area of the storage medium 23 will be mapped to the database area 601 of the read-only recording medium as shown in FIG. 6.

Figure 6:
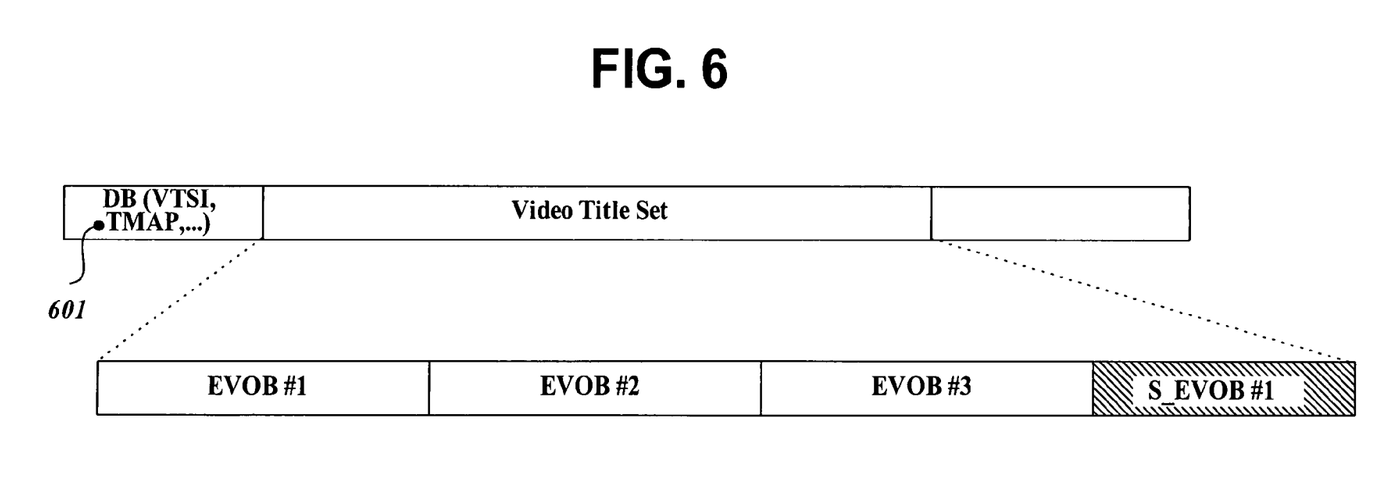
FIG. 6 illustrates data streams and management information separately recorded on a read-only disk.

The method of reproducing a read-only recording medium (e.g., HD-DVD) having content data stored in its data area as shown in FIGS. 5 and 6 and navigation information stored in its database area as shown in FIGS. 4a and 4b will now be described.

Figure 7:
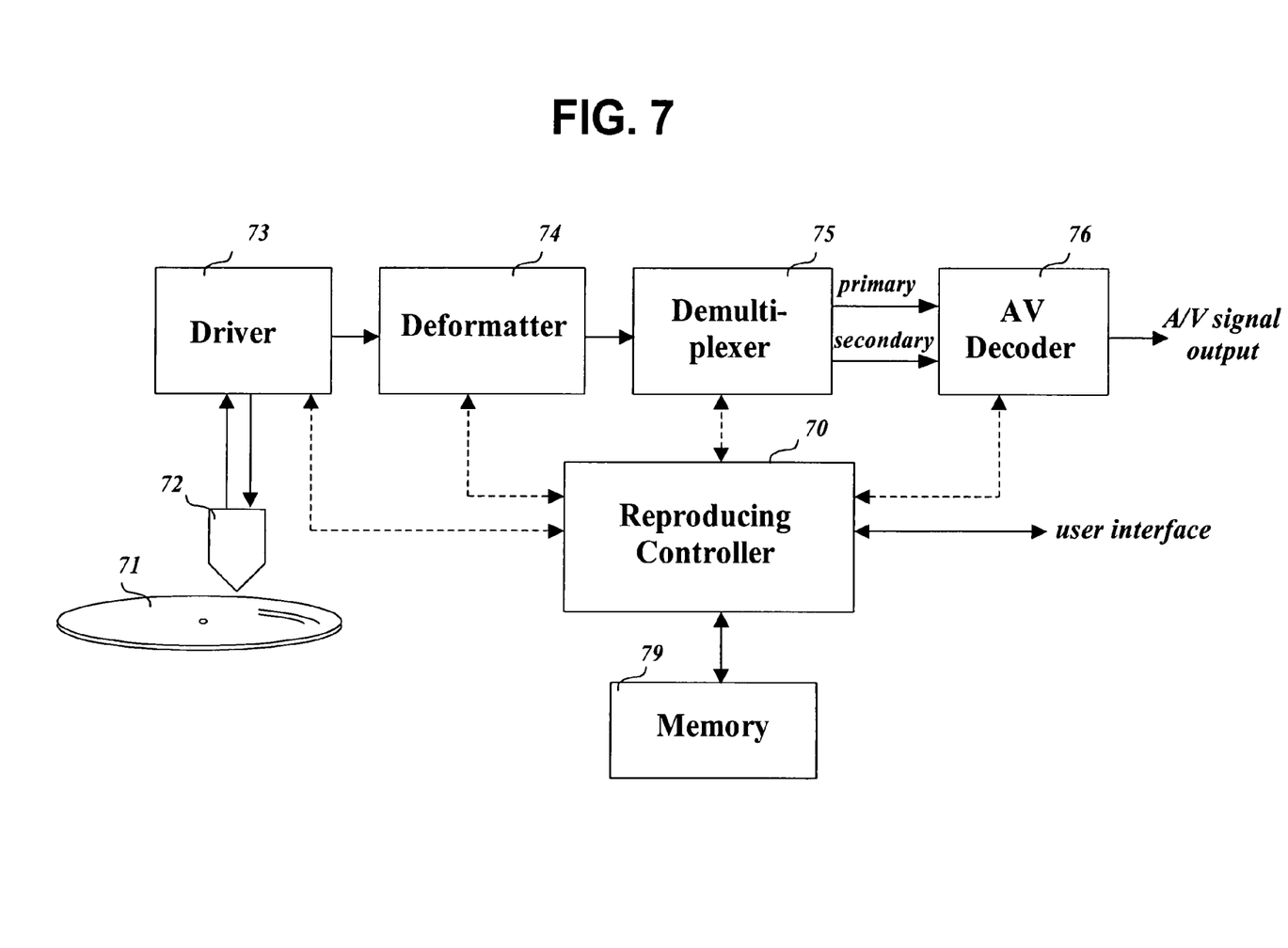
FIG. 7 illustrates a block diagram of an apparatus for reproducing a read-only recording medium having a data structure according to the present invention.

FIG. 7 is a block diagram of an apparatus for reproducing a read-only recording medium 71 having the data structure according to the present invention thereon. If data reproduction is requested, a reproducing controller 70 controls a driver 73 so that an optical pickup 72 can read the aforementioned data structure. First of all, the navigation information including the information shown in FIG. 3 and FIGS. 4a and 4b is loaded into a memory 79 for reproduction of the recorded data. Based on the loaded navigation information and user input received through user interface (e.g., buttons on the apparatus, remote controller, etc), the reproducing controller 70 controls the driver 73 to read a recorded title (primary data stream) from the recording medium 71. The user input may specify the recorded title to read, which is managed as an EVOB by the navigation information. The user input may be entered through a graphical user interface pre-programmed in the reproducing controller 70. The reproducing controller 70 controls the reproduction of the specified title with reference to the user input and the loaded navigation information. If the TMAP_category field contained in the TMAP information for the specified title (EVOB) in the loaded navigation information, i.e., video title set information (VTSI) indicates that the title is a primary data stream, the recording controller 70 reads the EVOB attribute information contained in the video title set information (VTSI) and sets the operation mode of an A/V decoder 76 accordingly based on the attribute information. Also, the recording controller 70 controls the optical pickup 72 to read data from the start position of the EVOB corresponding to the specified title based on the information on the start position of the EVOB contained in the TMAP information of the selected title (e.g., file name or distance from the start position of the video title set information (VTSI) expressed in terms of the number of logical blocks).

A deformatter 94 receives a data stream reproduced by the driver 3 and the optical pickup 2 and provides the data to a multiplexer 95 after performing error correction operations. The demultiplexer 75 demultiplexes the input data stream into audio and video data. The A/V decoder 76 retrieves original video and audio signals by decoding the primary video and audio data. During the reproduction process, the operation of the deformatter 74, demultiplexer 75, and A/V decoder 76 is supervised by the reproducing controller 70. The A/V decoder 76 may comprises a plurality of internal decoders so as to decode the primary A/V data, secondary video and/or audio data simultaneously.

If there is secondary content (S_EVOB) associated with a selected title (EVOB), the data stream of the secondary content is decoded together with the selected primary data stream. The link to the secondary content is obtained by specifying the TMAP information associated with the secondary content, which can be conducted in various ways. For example, the link to the TMAP information of the secondary data stream may be added to the management information for the selected title, the link to the TMAP information may be implicit by giving the TMAP information the same name as the linked EVOB file except for the extension, the name of the linked TMAP file may be specified in a separate script file written in a markup language (e.g., xml), or the user may specify a TMAP file. In the case where the linked TMAP file is specified by a separate script file, the reproducing controller 70 is equipped with the function of interpretation of the used markup language.

If particular TMAP information is specified, the reproducing controller 70 reads the TMAP_category field contained in the TMAP information. If the TMAP_category field indicates that the associated stream is a secondary data stream, the reproducing controller 70 reads the S_EVOB attribute information which is stored in a field of the TMAP information or in a separate file and sets values necessary for the operation of the A/V decoder 76 based on the attribute information. Also, the reproducing controller 70 controls the optical pickup 72 to reproduce recorded data from the start position of the secondary content data (S_EVOB) based on the S_EVOB start position information (e.g., file name or S_EVOB start address) contained in the specified TMAP information.

The selected primary title and its secondary content data cannot be reproduced simultaneously from the recording medium 71. The reproducing controller 70 first loads E_SVOB data into the memory 79 based on the TMAP information of the secondary content data. After finishing the loading of the E_SOVB data, the reproducing controller 70 performs the reproduction of the selected primary title (EVOB). During the reproduction of the primary title, the reproducing controller 70 provides the secondary data stream loaded in the memory 79 to the A/V decoder 76, thereby the primary title and its secondary data being decoded together.

The secondary content data associated with the selected title may be obtained from a server (not illustrated) through a network rather than from the recording medium 71. In this case, the apparatus shown in FIG. 7 has additional network interfacing means. When obtaining the secondary content data through a network, the TMAP information for the secondary content-data (E_SVOB) as well as the data stream of the content is obtained from the network.

The TMAP_category field of the TMAP information for the secondary content data which is not provided together with the primary data stream (EVOB) through the recording medium 71 has a value indicative of the fact, e.g., a value of 2. The information on the start position of the secondary content data provided through the network and stored in the memory 79 temporarily, which is written in the TMAP information for the secondary content data, is expressed in terms of the number of bytes from the start position of the TMAP information. This is for the case where the secondary content data and TMAP information therefor are provided as a single file in which the TMAP information precedes the content data. If the secondary content data and TMAP information are provided as separate files, the file name of the secondary content data can be written in the information on the start position of the secondary content data contained in the TMAP information.

If the TMAP_category field of the TMAP information has a value indicating that the associated stream is a secondary data stream not recorded on the recording medium 71, the reproducing controller 70 loads the secondary content data from a temporary memory (e.g., the memory 79) based on the information on the start position of the secondary content data (e.g., the number of bytes from the start position of the TMAP information). In this case, the attribute information for the secondary content data is obtained from the TMAP information or a received file as described above.

At least one embodiment of the present invention facilitates the design and upgrade of firmware for operating reproducing apparatuses in that the structure of the navigation information for primary content data can accommodate the navigation information for secondary content data associated with the primary content data.

While the invention has been disclosed with respect to a limited number of embodiments, those skilled in the art, having the benefit of this disclosure, will appreciate numerous modifications and variations therefrom. It is intended that all such modifications and variations fall within the spirit and scope of the invention.

What is claimed is:

1. A transitory storage medium storing a data structure for managing reproduction of data streams by a reproducing apparatus, comprising:
   a first data stream of a first type, the first data stream including a main data stream;
   a second data stream of a second type, the second data stream associated with the first data stream to be presented simultaneously with the first data stream, the second data stream including an auxiliary stream associated with the main data stream;
   first access management information for managing reproduction for the first data stream by the reproducing apparatus, the first access management information including first type information indicative of information for the first type and first position information for the first data stream;
   second access management information, separate from the first access management information, for managing reproduction for the second data stream by the reproducing apparatus, the second access management information including second type information indicative of information for the second type and second position information for the second data stream;
   first attribute information for the first data stream, the first attribute information including information for a sub-picture; and
   second attribute information for the second data stream, the second attribute information not including the information for a sub-picture,
   wherein the first position information for the first data stream is a value corresponding to a distance between a particular position in a file storing management information for all data streams of the first type recorded on the storage medium and a start position of the first data stream.

2. The non-transitory storage medium of claim 1, wherein the first access management information for managing reproduction for the first data stream includes a link to the second access management information for managing reproduction for the second data stream to present the second data stream together with the first data stream.

3. A method of recording data on a recording medium, comprising the steps of:
   a) recording a first data stream of a first type and a second data stream of a second type on the recording medium, the first data stream including a main data stream and the second data stream including an auxiliary stream associated with the main data stream, the second data stream being associated with the first data stream to be presented simultaneously with the first data stream;
   b) recording first access management information for the first data stream, the first access management information including first type information indicative of information for the first type and first position information for the first data stream;
   c) recording second access management information, separate from the first access management information, for the second data stream, the second access management information including second type information indicative of information for the second type and second position information for the second data stream;
   d) recording first attribute information for the first data stream, the first attribute information including information for a sub-picture; and
   e) recording second attribute information for the second data stream, the second attribute information not including the information for a sub-picture,
   wherein the first position information for the first data stream is a value corresponding to distance between a particular position in a file storing management information for all data streams of the first type recorded on the recording medium and a start position of the first data stream.

4. The method of claim 3, wherein the first access management information for managing reproduction for the first data stream includes a link to the second access management information for managing reproduction for the second data stream to present the second data stream together with the first data stream.

5. A method of reproducing a recorded data stream from a recording medium, comprising the steps of:
   (a) reading access management information for the data stream;
   (b) determining whether the data stream is one of a first type and a second type based on type information included in the read access management information indicating one of the first type and the second type, the data stream of the first type including a main data stream and the data stream of the second type including an auxiliary stream associated with the main data stream;
   (c) determining a position of the data stream based on position information included in the read access management information and the type information;
   (d) obtaining the data stream according to the determined type and the determined position of the data stream; and (e) decoding the data streams of the first type and the second type to present the data streams simultaneously, wherein if the determined type is the first type, the step (d) reads first attribute information for the data stream of the first type, the first attribute information including information for a sub-picture, and wherein if the determined type is the second type, the step (d) reads second attribute information for the data stream of the second type, the second attribute information not including the information for a sub-picture.

6. The method of claim 5, wherein the step (d) reads the data stream from the recording medium based on a file name of the data stream included in the read access management information.

7. The method of claim 5, wherein the step (c) determines the position of the data stream to be a value corresponding to a distance between a particular position in a file storing management information for all data streams of the first type recorded on the recording medium and a start position of the data stream if the type information indicates the first type.

8. The method of claim 5, wherein if the determined type is the first type, the step (d) reads the first attribute information from an attribute information table allocated in management information for all data streams of the first type recorded on the recording medium and uses the read first attribute information as information for controlling decoding of the data stream.

9. The method of claim 5, wherein if the determined type is the second type, the step (d) reads the second attribute information from the access management information from a separate file, and uses the read second attribute information as information for controlling decoding of the data stream.

10. The method of claim 5, wherein the second data stream is presented together with the first data stream by using a link to the second access management information for managing reproduction for the second data stream, the link being included in the first access management information for managing reproduction for the first data stream.

11. An apparatus for reproducing a data stream from a recording medium, comprising:

a reproducing unit configured to reproduce the data stream recorded on the recording medium;

a decoder configured to decode the data stream reproduced by the reproducing unit; and a controller configured to control the reproducing unit to read access management information for the data stream, the access management information including type information indicating one of a first type and second type and position information for the data stream, the controller configured to determine whether the data stream is one of the first type and the second type based on the type information, the data stream of the first type including a main data stream and the data stream of the second type including an auxiliary stream associated with the main data stream, the controller configured to determine a position of the data stream based on the type information and the position information, the controller configured to control the reproducing unit to obtain the data stream according to the determined type and the determined position of the data stream and to control the decoder to decode the data streams of the first type and the second type to present the data streams of the first type and the second type simultaneously, wherein if the determined type is the first type, the controller controls the reproducing unit to read first attribute information for the data stream of the first type, the first attribute information including information for a sub-picture, and wherein if the determined type is the second type, the controller controls the reproducing unit to read second attribute information for the data stream of the second type, the second attribute information not including the information for a sub-picture.

12. The apparatus of claim 11, wherein the controller is configured to control the reproducing unit to read the data stream from the recording medium based on a file name of the data stream included in the read access management information.

13. The apparatus of claim 11, wherein the controller is configured to determine the position of the data stream to be a value corresponding to a distance between a particular position in a file storing management information for all data streams of the first type recorded on the recording medium and a start position of the data stream if the type information indicates the first type.

14. The apparatus of claim 11, wherein the controller is configured to control the decoder to decode the first and the second data streams such that the second data stream is presented together with the first data stream by using a link to the second access management information for managing reproduction for the second data stream, the link being included in the first access management information for managing reproduction for the first data stream.

* * * * *